(12) United States Patent
Costabeber

(10) Patent No.: US 8,603,385 B2
(45) Date of Patent: Dec. 10, 2013

(54) METHOD FOR MANUFACTURING THREE-DIMENSIONAL OBJECTS

(76) Inventor: Ettore Maurizio Costabeber, Zane' (IT)

( * ) Notice: Subject to any disclaimer, the term of this patent is extended or adjusted under 35 U.S.C. 154(b) by 158 days.

(21) Appl. No.: 12/937,698

(22) PCT Filed: May 13, 2009

(86) PCT No.: PCT/IB2009/005583
§ 371 (c)(1),
(2), (4) Date: Dec. 9, 2010

(87) PCT Pub. No.: WO2009/138859
PCT Pub. Date: Nov. 19, 2009

(65) Prior Publication Data
US 2011/0121491 A1    May 26, 2011

(30) Foreign Application Priority Data
May 14, 2008 (IT) ................................ VI2008A0109

(51) Int. Cl.
*B29C 35/08* (2006.01)
*B29C 41/02* (2006.01)

(52) U.S. Cl.
USPC ............ 264/401; 264/162; 264/237; 264/317

(58) Field of Classification Search
USPC .......................... 264/162, 237, 308, 317, 401
See application file for complete search history.

(56) References Cited

U.S. PATENT DOCUMENTS

| | | |
|---|---|---|
| 5,820,811 A | 10/1998 | Murakami et al. |
| 2004/0166187 A1 | 8/2004 | Fong |
| 2005/0186508 A1 | 8/2005 | Nagano et al. |
| 2007/0241482 A1 | 10/2007 | Giller et al. |

*Primary Examiner* — Leo B Tentoni
(74) *Attorney, Agent, or Firm* — IP Strategies

(57) ABSTRACT

Method for manufacturing three-dimensional objects (W) consisting of superimposed layers (L) of a base material (M), liquid at ambient temperature and capable of solidifying permanently following a stimulating action, comprising the following operations: spreading a layer (L1) of the liquid base material (M) on the preceding layer (L), selectively exposing the layer (L1) to stimulation in one or more predefined areas (K), repeating the spreading operation and the exposure for each successive layer of the three-dimensional object (W), cooling the layers (L) to a predefined operating temperature below ambient temperature before the stimulation, in order to make the base material (M) solidify.

14 Claims, 9 Drawing Sheets

METHOD FOR MANUFACTURING THREE-DIMENSIONAL OBJECTS

FIELD OF THE INVENTION

The present invention concerns a method for manufacturing three-dimensional objects in layers, which in technical jargon is known as "stereolithography". The present invention also concerns a stereolithography machine employing said method.

BACKGROUND ART

As is known, stereolithography is extensively used for rapidly prototyping three-dimensional, even complex objects, as it allows said objects to be manufactured in a very short time and practically with no need to use any special equipment.

In general, the stereolithography technique includes a first virtual division of the geometry of the object to be reproduced in layers having a predefined thickness, which are then actually produced by a stereolithography machine that places them one on top of the other in order to create the object.

The layers are made of a liquid resin that can solidify permanently under the effect of suitable stimulation.

More precisely, the resin is spread on a supporting surface in the thickness corresponding to one layer of the object to be reproduced and then is selectively exposed to stimulation in the areas corresponding to the volume of the object.

A plastic-based resin is generally used and its solidification is obtained by polymerization through exposure to a laser beam.

According to a first known construction form, a stereolithography machine comprises a vat containing the liquid resin, in which a vertically moving platform that supports the object being produced is immersed.

The platform is lowered until covering each layer of the object with a layer of liquid whose thickness corresponds to that required for the successive layer. The liquid layer is then subjected to stimulation in the areas corresponding to the volume of the object to be manufactured, so that it solidifies and adheres to the underlying layer.

The process for manufacturing the three-dimensional object proceeds analogously for the successive layers, with the platform being progressively lowered.

The known technique described above poses the drawback that it is rather difficult to control the thickness of the layers.

In fact, the reduced thickness of each layer, which is generally just a few fractions of a millimeter, and the viscosity of the base material in the liquid state hinder the distribution of the liquid resin on the object being produced.

Consequently, the thickness of the layers often lacks uniformity and this leads to the production of a finished object whose dimensions are imprecise.

Various devices are known, which tend to limit the above mentioned drawback, substantially based on the use of spatulas that level the surface of the liquid resin, but none of them solves the problem in a satisfactory way.

A further drawback posed by the known technique described above is represented by the need to prepare a certain number of supports for the object being produced and arrange them on the platform.

The supports are necessary both to bear the dead load of the object, especially in the case where it has parts that projects towards the outside, and to support the parts that, in particular configurations of the object, are initially separated from the body of the object itself.

By way of example, the dark area of FIG. 1 schematically illustrates a generic three-dimensional object produced according to the known art, which is indicated by W', while the hatched areas show the above mentioned supports S related to it.

The supports also make it possible to oppose the stress which is generated during the polymerization of the layers and which, due to the reduced thickness of the layers themselves, would deform them in an unacceptable manner.

The supports, however, pose the drawback that they require an additional design stage, which increases the objects overall production time and costs.

The supports also pose another drawback, lying in that they cannot be reused for the production of other objects and therefore are wasted, thus further increasing the cost of the object.

Furthermore, when the object to be manufactured is particularly complex, it is not possible to produce the supports, which actually limits the applicability of the stereolithography technique.

According to a known technique, the supports are produced by the stereolithography machine at the same time as the three-dimensional object, thus making up an integral part of the latter.

Obviously, in addition to the drawbacks already described, the above mentioned technique poses a further drawback, represented by the fact that it is necessary to remove the supports mechanically, with a consequent further increase in the cost of the object.

Furthermore, the removal of the supports involves the risk of breaking the object, which is another drawback.

In addition to the above, there is a further drawback represented by the slowing down in the manufacture of the object, as the stimulation of the base material must be carried out also in the areas corresponding to the supports.

In the attempt to overcome the above mentioned drawbacks, another technique has been developed, which uses a resin that at room temperature is in the form of jelly and therefore is substantially stable from a dimensional point of view.

According to this construction technique, the jelly resin is heated in order to liquefy it, so that it can be spread on the object being produced.

Therefore, differently from the previous case, the object is not immersed in a liquid resin.

Once spread on the object, the resin cools down and forms a jelly layer that is relatively stable at room temperature and is then polymerized by means of a selective stimulation procedure analogous to that already described.

The process is repeated for the successive layers, until completing the object, which is finally heated in order to obtain the liquefaction of the non-polymerized resin and thus extract the finished object.

Advantageously, the technique described above makes it possible to avoid the use of supports for the object being produced, which in fact is supported by the surrounding jelly resin.

However, the above mentioned technique poses a series of drawbacks, among which is the fact that it is rather slow, due to the time necessary for each deposited layer to cool down.

A further drawback lies in that the resin undergoes partial deterioration due to the double heating cycle to which it is subjected, during the spreading of each layer and at the end of the production process, to the detriment of the mechanical characteristics of the object.

The above mentioned drawback, which means that the excess resin cannot be used again to produce other objects, together with the already mentioned slowness of this technique, further increase the cost of the finished object.

Furthermore, analogously to the first known technique previously described, this second known technique does not resolve the problem regarding the control of the thickness of the layers, either, but can even worsen it.

In fact, during the spreading of each layer, the viscosity of the resin is very high, which can generate irregularities on the surface of the layer itself.

The present invention intends to overcome all the drawbacks of the known art outlined above.

DISCLOSURE OF THE INVENTION

In particular, it is a first object of the invention to implement a method and to develop a machine for manufacturing three-dimensional objects formed by a plurality of superimposed layers, which do not require the use of supports for the three-dimensional object being produced.

It is a further object of the invention to propose a method and a machine that make it possible to produce three-dimensional objects more rapidly compared to the known technique, the objects having the same geometry.

It is another object of the invention to obtain three-dimensional objects that are more accurate than those obtainable with the known technique from a dimensional point of view.

It is another, yet not the least object of the invention, to ensure that the base material used for making the object does not deteriorate excessively during the production process.

The objects described above are achieved by a method for manufacturing three-dimensional objects according to claim 1, as well as by a machine employing said method and carried out according to claim 13.

Further details of the method and machine that are the subjects of the invention are described in the corresponding dependent claims.

Advantageously, the absence of supports makes it possible to reduce the cost of the finished three-dimensional object compared to the cost of the same object obtained by means of the first known technique described above.

Still advantageously, the absence of supports makes it possible to manufacture objects that are geometrically more complex than those which can be obtained through the known methods.

Still advantageously, the fact that the base material does not deteriorate allows the excess material to be used again for manufacturing other objects.

Furthermore, advantageously, the reduced production time and the possibility to reuse the excess base material make it possible to reduce the cost of the object compared to the second known technique described above.

Furthermore, the higher degree of precision reached by the method that is the subject of the invention compared to the known technique advantageously makes it possible to satisfy the needs of more market sectors.

BRIEF DESCRIPTION OF THE DRAWINGS

The said objects and advantages, and others which are better highlighted below, will be illustrated in detail in the description of a preferred embodiment of the method and the machine of the invention, which is provided by way of non-limiting example with reference to the attached drawings, wherein.

DETAILED DESCRIPTION OF A PREFERRED EMBODIMENT

The method of the invention, known as "stereolithography" in technical jargon, is particularly suitable for rapidly prototyping three-dimensional objects W.

As already explained, the method consists in making the three-dimensional object W by superimposing a plurality of layers L of a base material M.

The above mentioned base material M is liquid at ambient temperature but, following suitable stimulation, can alter its molecular structure in such a way as to solidify permanently.

The above mentioned base material M is preferably but not necessarily a photopolymer that solidifies through polymerization when it is exposed to a source of predefined radiations, like for example laser light.

Materials of the type described above are well known and largely used in the field of stereolithography, and therefore will not be described in greater detail herein.

It is also evident that, in construction variants of the invention, it is possible to choose a base material M that is sensitive to a kind of stimulation different from laser light, provided that it is capable of causing the permanent solidification of the base material M in the stimulated areas.

Figure 1:
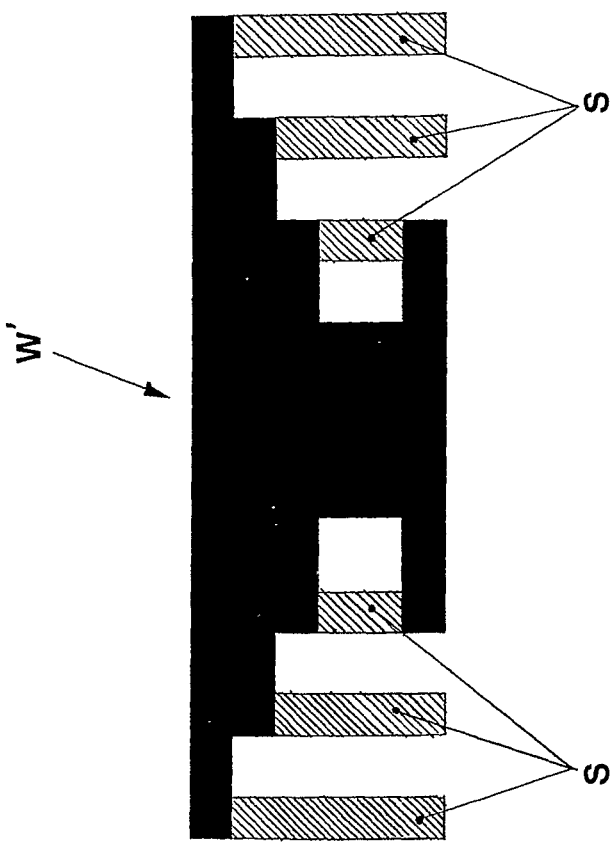
FIG. 1 shows a schematic view of a three-dimensional object belonging to the known art.
Figure 2:
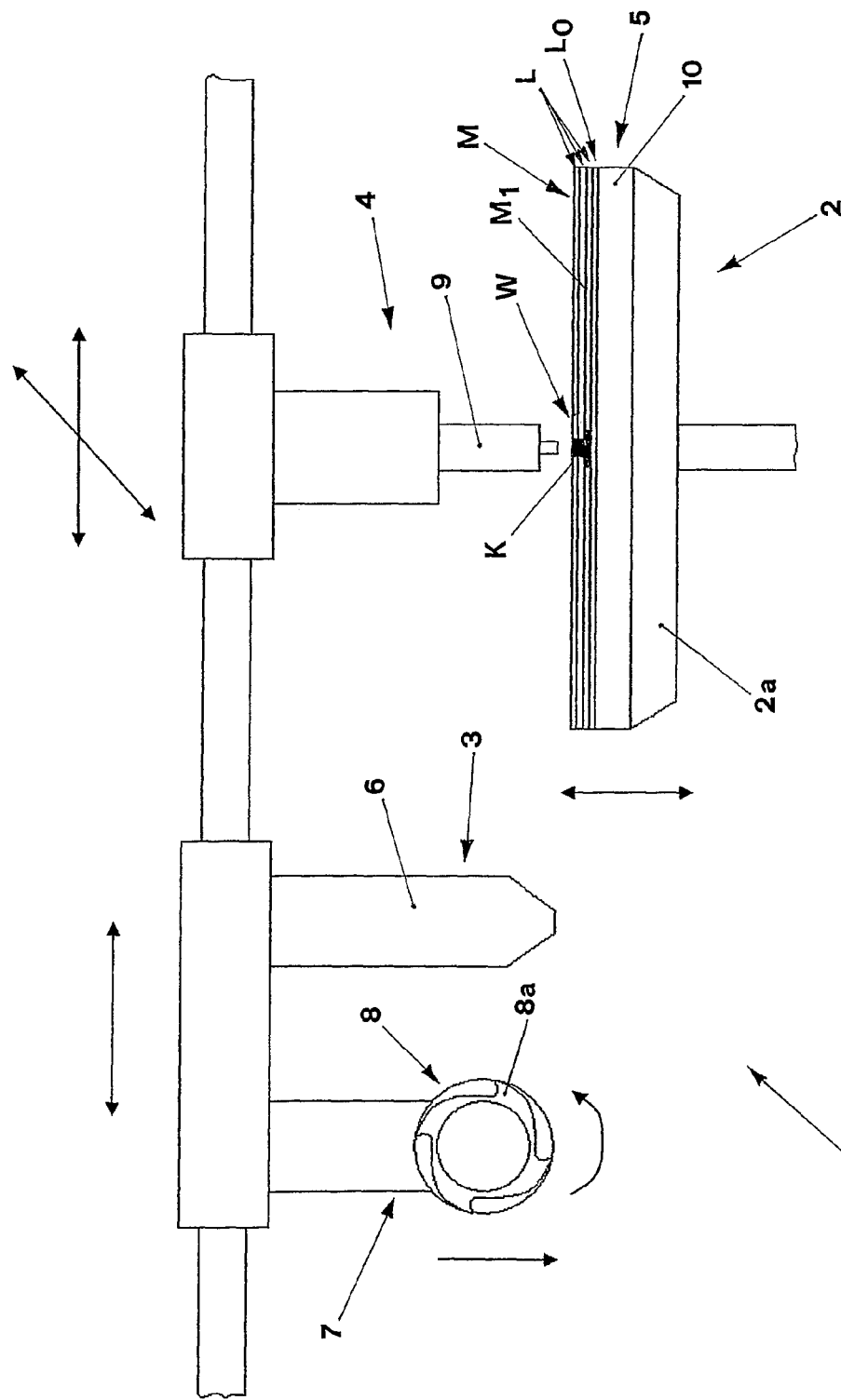
FIG. 2 shows a schematic view of the machine that is the subject of the invention.

The method that is the subject of the invention is described with particular reference to the machine schematically shown in FIG. 2 and indicated as a whole by 1 therein.

It can be observed that the machine 1 comprises means 2 for supporting the three-dimensional object W being produced, which preferably comprise a platform 2a.

The machine 1 is also provided with means 3 for dispensing the base material M, suited to deposit each layer L on the previous layer of the three-dimensional object W and preferably but not necessarily comprising a dispensing nozzle 6.

Furthermore, there are means 4 suited to emit the above mentioned stimulation, capable of selectively solidifying prefixed areas K of the layer L corresponding to the volume of the three-dimensional object W to be obtained and indicated by darker areas for the sake of simplicity.

Preferably, the emitting means 4 comprise a laser generator 9 that advantageously makes it possible to solidify a very limited area K of the base material M, thus contributing to the achievement of a dimensionally accurate object W.

According to the invention, the machine 1 comprises means 5 for cooling the deposited layers L, in order to maintain them at a prefixed operating temperature lower than ambient temperature.

Preferably, said cooling means 5 are associated with said supporting means 2 in order to be advantageously arranged in direct contact with the layers L and thus guarantee effective cooling.

Furthermore, said cooling means 5 preferably comprise Peltier cells 10 that advantageously have limited overall dimensions and high cooling effectiveness.

It is evident, however, that in other construction variants of the invention, not represented herein, both the position and the type of cooling means 5 may be different from those described and illustrated herein.

Preferably but not necessarily there are also means 7 for levelling the layers L, which preferably comprise a tool 8 for the mechanical removal of material, like for example a cutter 8a.

The supporting means 2, the dispensing means 3, the emitting means 4 and the levelling means 7 can move in relation to one another thanks to the presence of power means that are not illustrated herein but are known per se to those skilled in the art.

Figure 4:
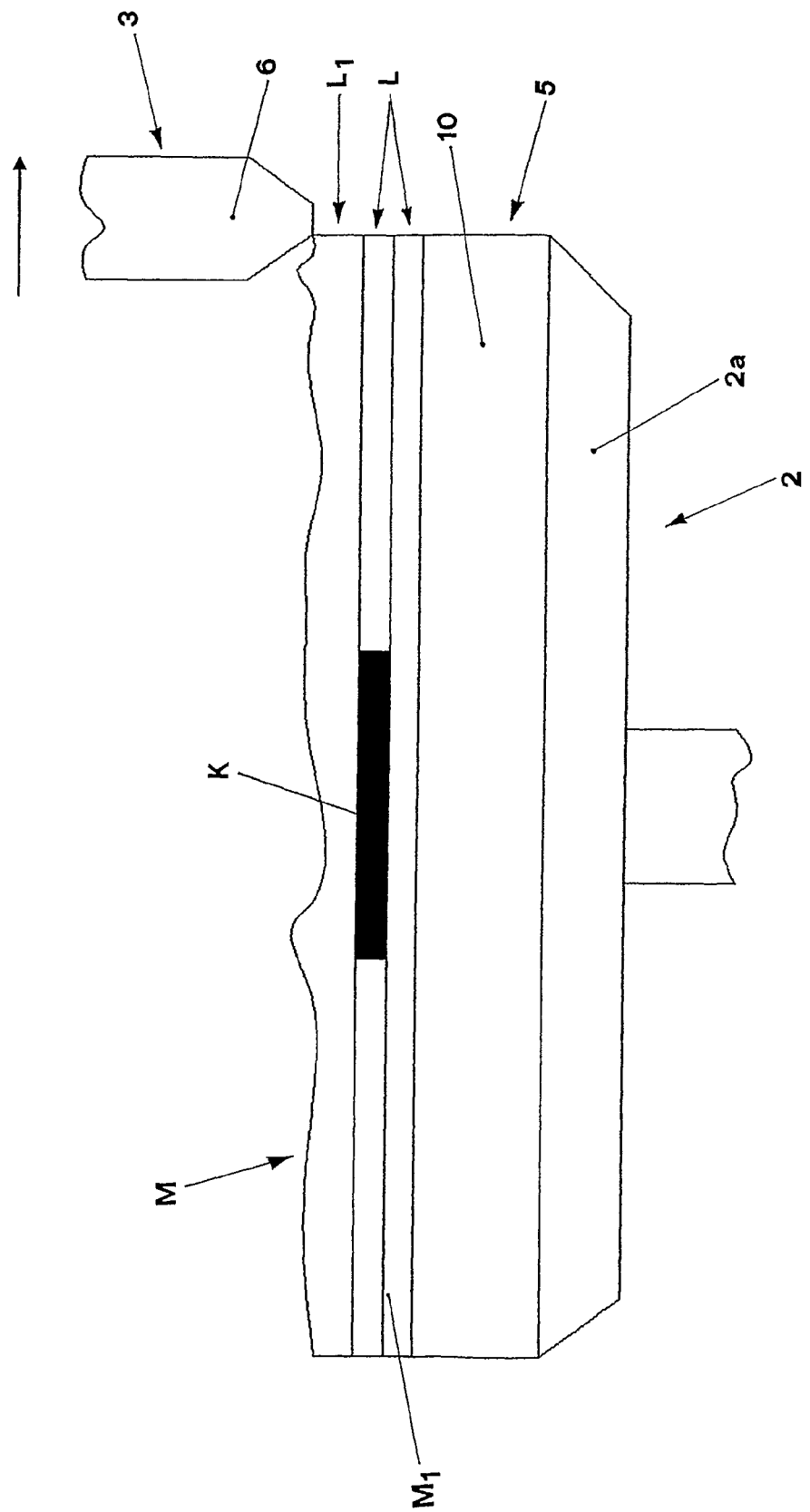

The method of the invention for manufacturing three-dimensional objects W comprises a first operation for spreading a layer L1 of liquid base material M on the previous layer L, as shown in FIG. 4.

During the above mentioned operation, the base material M is preferably at ambient temperature, so that, advantageously, it spontaneously assumes a liquid form with no need to be heated.

The method that is the subject of the invention further comprises the selective exposure of said layer L1 to pre-established stimulation in predefined areas K that correspond to the volume of the three-dimensional object W to be obtained and are represented by darker areas in the figures.

The above-mentioned spreading and selective exposure are repeated for each successive layer L of the three-dimensional object W.

According to the invention, the method comprises a further operation for cooling the layers L to a prefixed operating temperature lower than ambient temperature, so that the base material M of the layers L solidifies and they can assume a stable form.

The layers L, solidified as described above, are capable of supporting the successive layers and thus eliminate the need to use supports for the three-dimensional object W being produced, thus achieving the first object of the invention.

The layers L maintain said stable form for so long as the base material M is maintained at the operating temperature.

The operating temperature is preferably but not necessarily low enough to induce the temporary solidification of the base material M.

Obviously, in construction variants of the invention it will be possible to adopt an operating temperature that, even if without solidifying completely the base material M, considerably increases its viscosity, for example to give it the consistency of jelly.

Said operating temperature is preferably maintained constant on the layers L for the entire duration of the spreading operation and of the exposure of the layers L, until the three-dimensional object W has been completed.

Furthermore, the cooling of each successive layer L1 preferably takes place spontaneously by contact with the previous layer L, thus achieving the almost instantaneous solidification of the base material M.

According to a construction variant of the invention, not represented herein, the base material M is spread selectively and only in the areas corresponding to the volume of the object W, advantageously making it possible to reduce the production time of the object W and consequently the related costs.

Said selective spreading operation can be adopted in particular if the base material M cools down very rapidly, for example when the new layer L1 is very thin and cools down by contact with the preceding layer L.

The cooling effect is preferably obtained by means of Peltier cells 10 that advantageously ensure high effectiveness and at the same time very limited overall dimensions.

It is evident, however, that in construction variants of the invention the cooling of the layers L can be obtained by means of cooling fluids, low temperature gas jets or in any other known manner.

Figure 5:
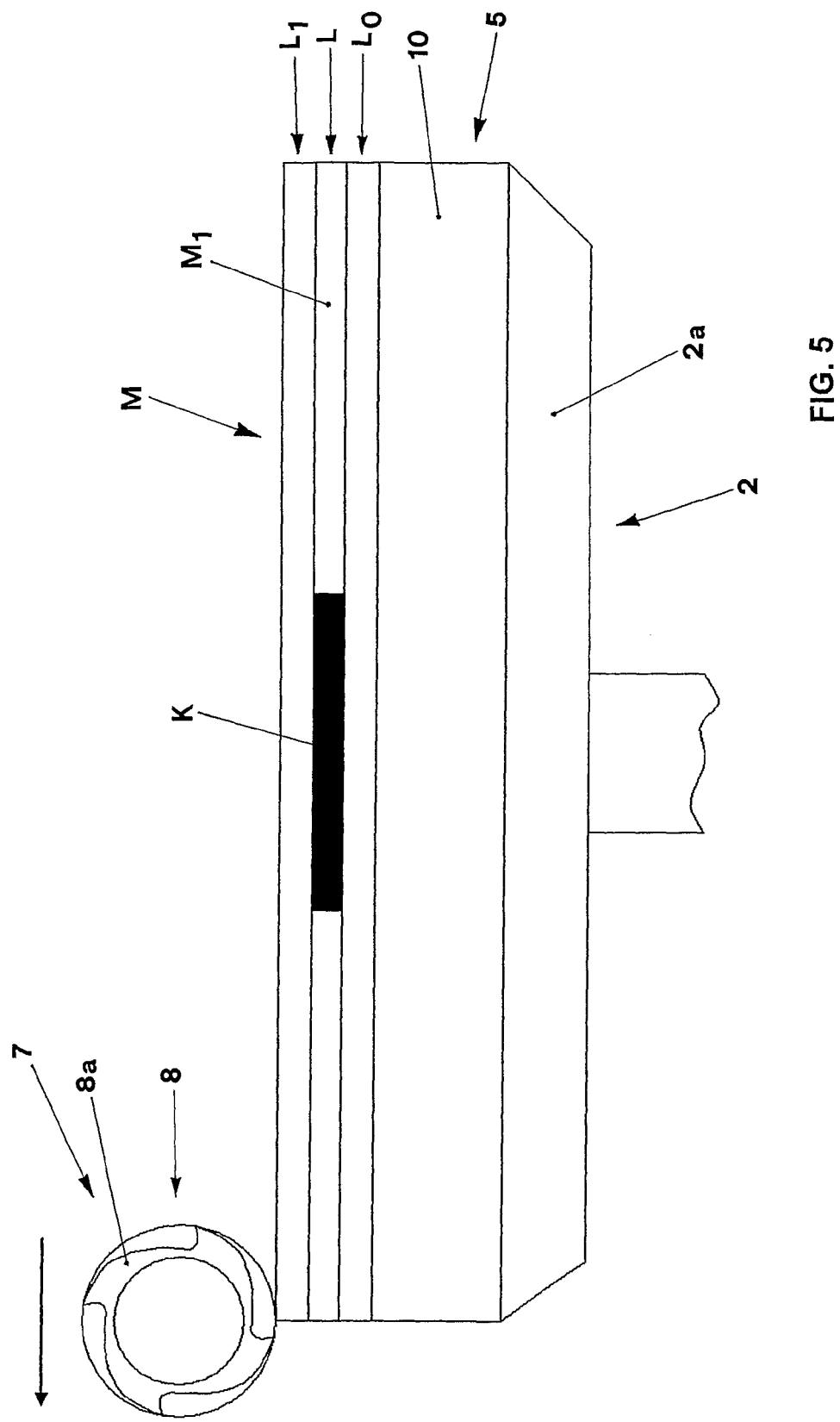

Preferably, and as illustrated in FIG. 5, the method of the invention comprises an operation for levelling the last deposited layer L1, before the spreading of the successive layer and, preferably but not necessarily, before stimulation.

Said levelling operation allows the excess material to be removed from the layer L1, in such a way as to achieve the desired thickness and obtain a uniform surface.

In fact, since the layer L1 is cool and therefore stable, it is possible to remove the base material M with great precision, for example by means of a mechanical process.

Furthermore, the layer L1 maintains the thickness obtained after the levelling operation.

Therefore, said levelling operation achieves the object to increase the overall dimensional precision of the three-dimensional object W compared to the degree of precision that can be obtained with the known methods.

Obviously, the greater the stability of the base material M, the higher the degree of precision achieved, in particular when the base material M is cooled until it becomes solid.

As regards the spreading of the layers L, it is preferably carried out by means of a dispensing device 6 that advantageously makes it possible to accurately control the quantity of base material M used.

The method that is the subject of the invention also includes an operation for eliminating the base material M1 that has not been stimulated, preferably by exposing the layers L to ambient temperature.

At such a temperature, the non-stimulated base material M1 returns to the liquid state, while the stimulated material K remains solid, thanks to its polymerized condition.

The above clearly shows that for the whole duration of the process implementing the method of the invention the base material M is not heated above ambient temperature.

Therefore, differently from the second known method described above, the base material M is not subjected to deterioration, and therefore one of the objects of the invention is thus achieved.

Obviously, the elimination of the non-stimulated material M1 can take place even above ambient temperature, thus allowing the liquefaction of the material M1 to be accelerated.

Differently from the second known method described above, the method of the invention does not require time for the stabilization of the base material M.

In fact, said stabilization takes place due to the practically instantaneous cooling of the base material M when this comes into contact with the preceding layer L, instead of through exposure to ambient temperature as in the case of said known method.

Therefore, the method of the invention achieves the object to ensure more rapid production of the object W compared to the known method mentioned above.

Figure 7:
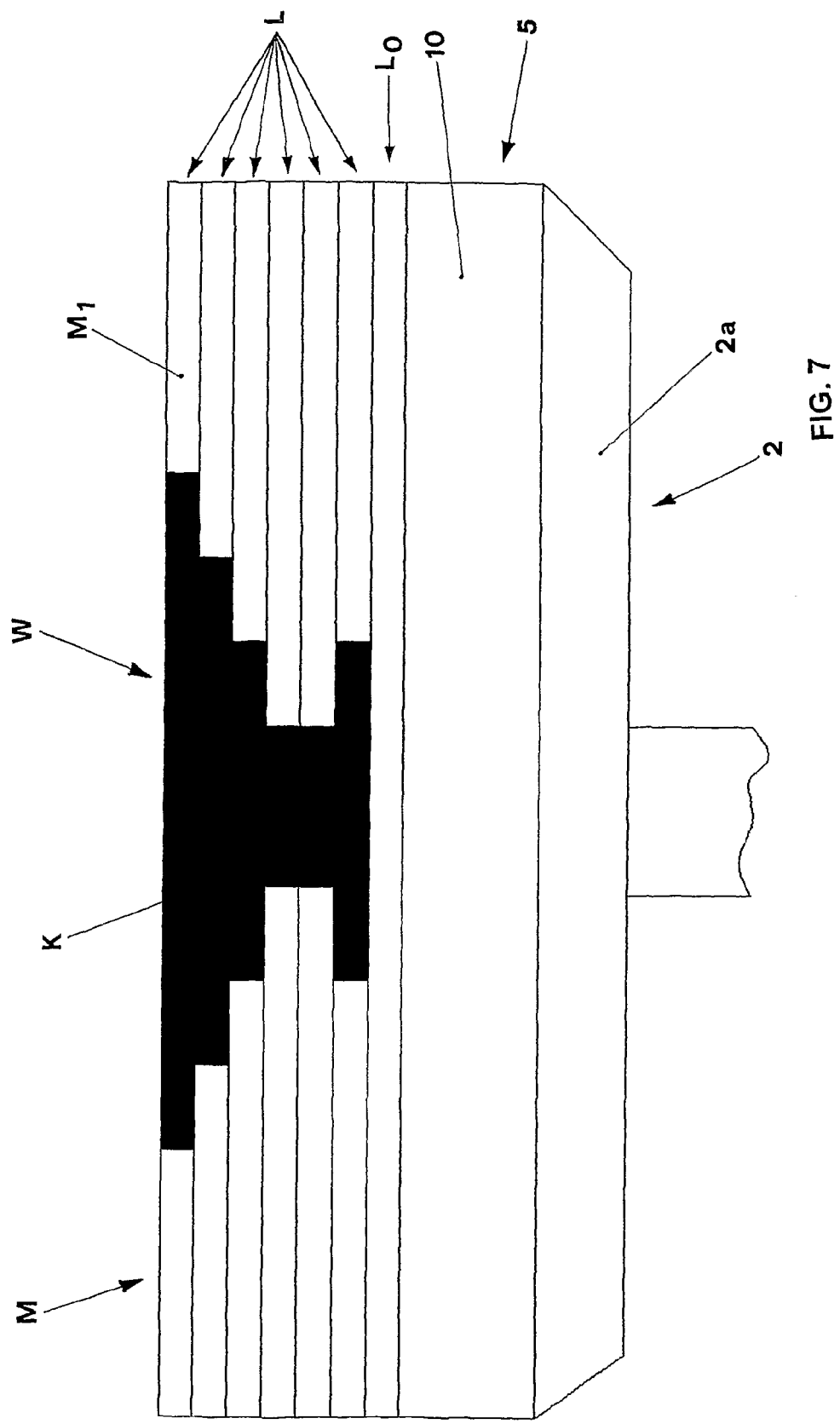

Preferably but not necessarily, and as shown in FIG. 7, the method of the invention includes the spreading of a base layer L0 in direct contact with the platform 2a, and said base layer is not subjected to stimulation.

The non-stimulated base layer L0 advantageously prevents the object W from adhering to the platform 2a, thus facilitating its collection once production has been completed.

In fact, during the above mentioned elimination of the non-stimulated material M1, the base layer L0 becomes liquid and causes the object W to become detached from the platform 2a.

From an operational point of view and as illustrated in FIG. 4, one layer L1 of the base material M at the liquid state is deposited on the previous layer L by means of the dispensing nozzle 6.

The base material M solidifies almost instantaneously when it comes into contact with the layers L previously spread and maintained cool by the Peltier cells 10.

Figure 6:
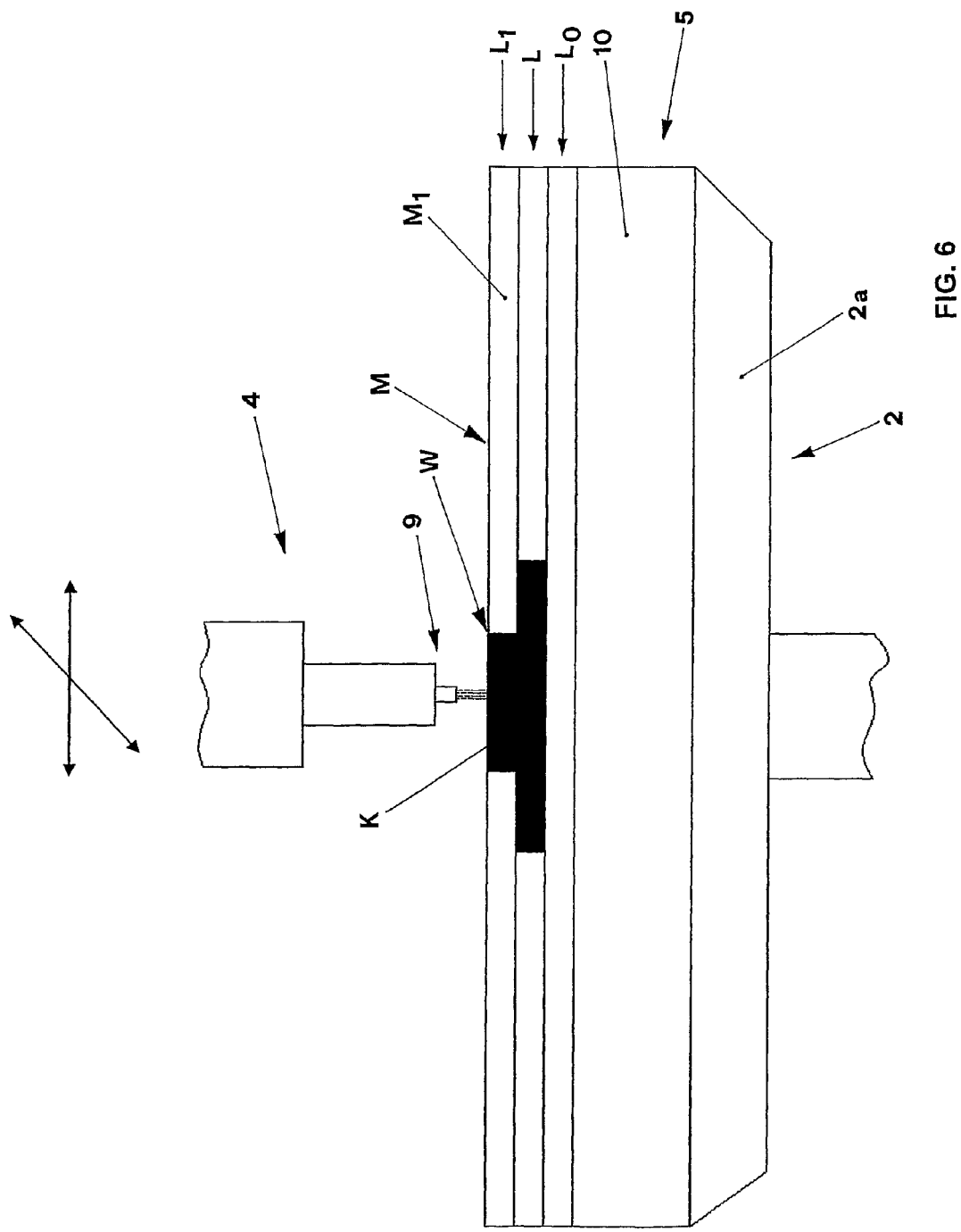

As shown in FIG. 5, the cooled layer L1 is leveled by means of the cutter 8a. Then, by means of the laser generator 9, the layer L1 is subjected to selective stimulation in predefined areas K corresponding to the volume of the three-dimensional object W to be obtained as shown in FIG. 6.

Figure 3:
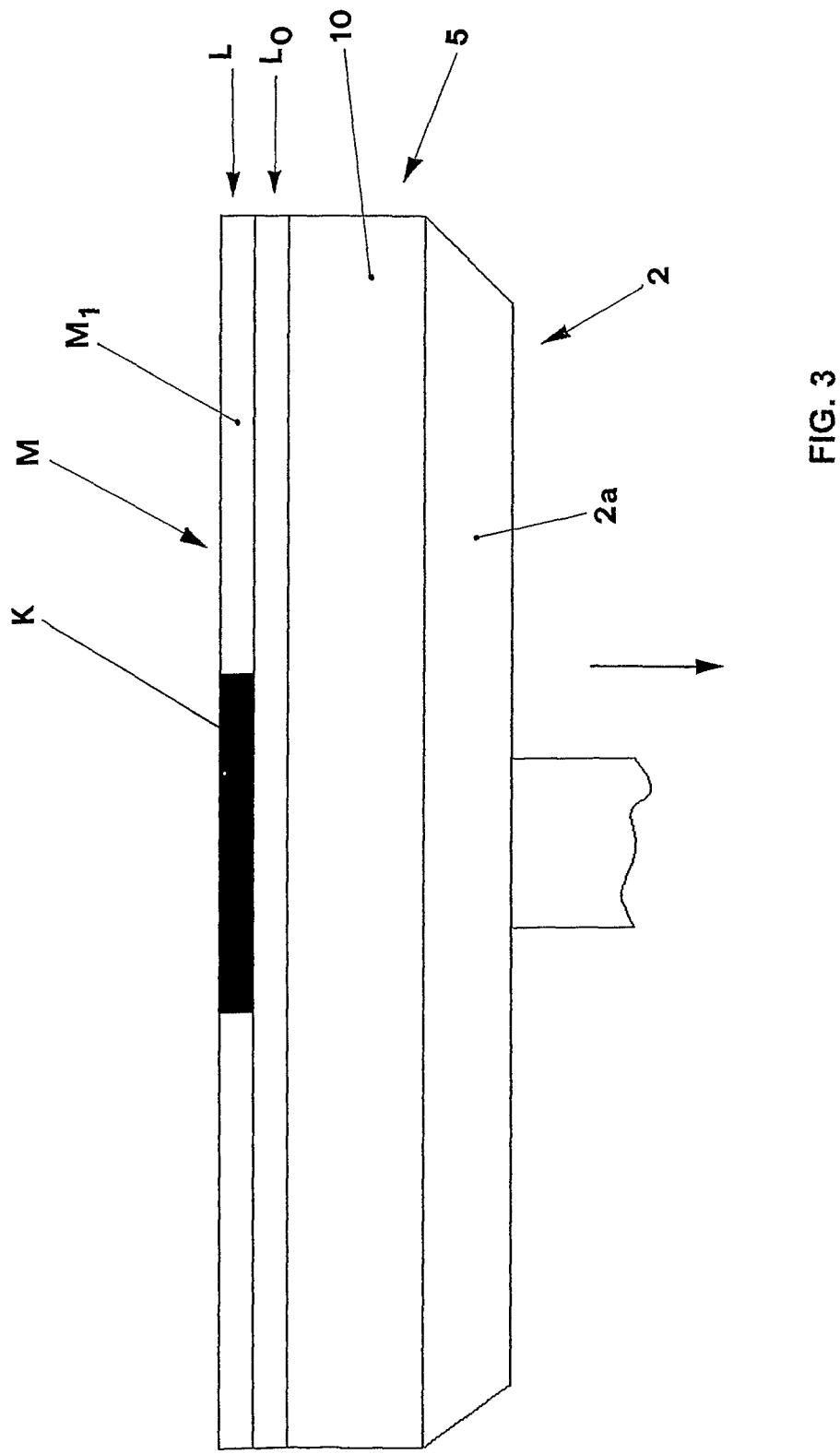
FIGS. 3 to 9 show different operating phases of the method that is the subject of the invention.

The method proceeds with the processing of the successive layers L, whereby the platform 2a is lowered, in relation to the dispensing means 3, the emitting means 4 and the levelling means 7, of a distance corresponding to the thickness of the layer L1 to be obtained, as shown in FIG. 3.

The situation after the superimposition of a certain number of said layers L is illustrated in FIG. 7, showing the base material M stimulated at the level of the predefined areas K that make up the three-dimensional object W being produced, indicated by darker areas.

Figure 8:
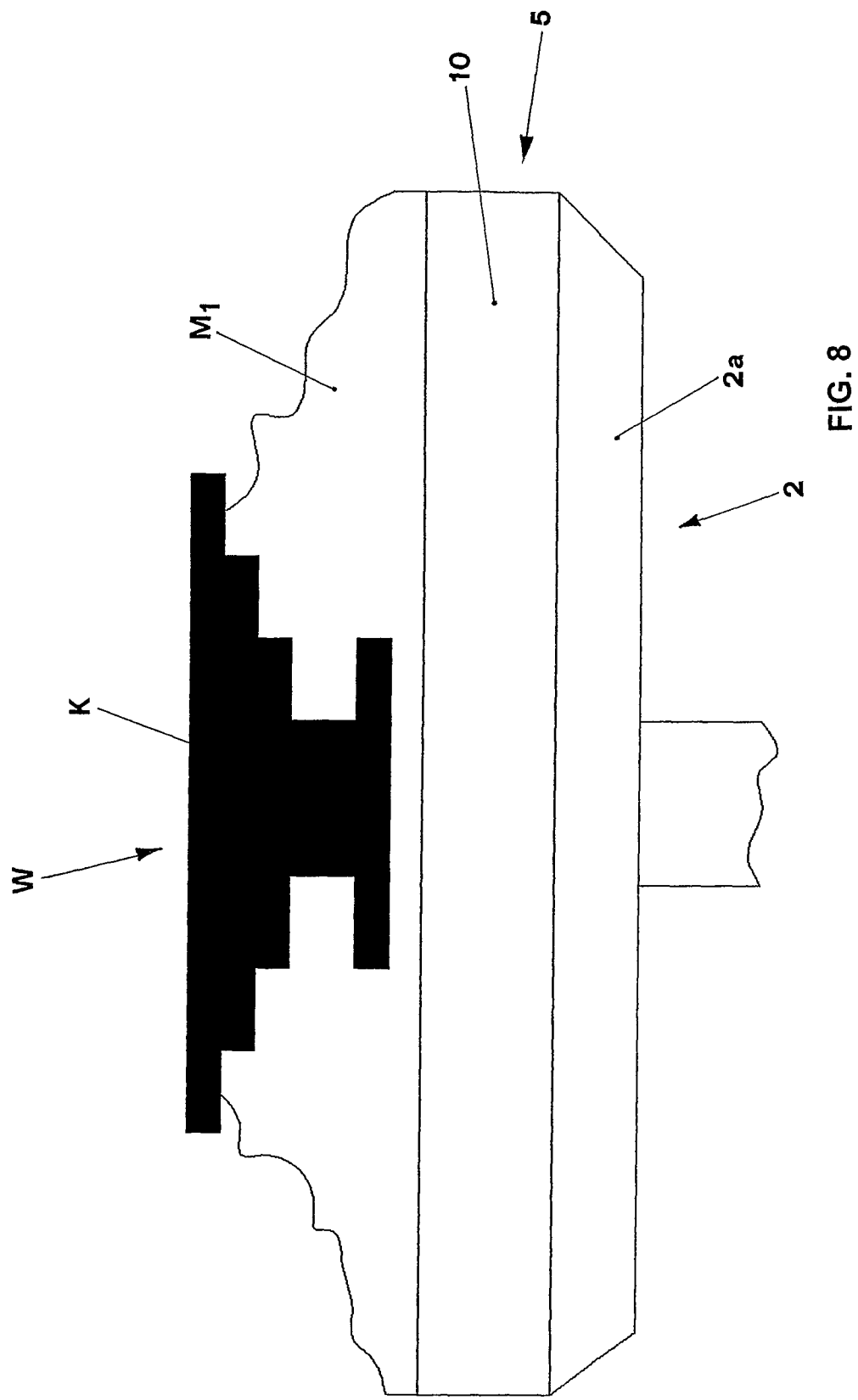
Figure 9:
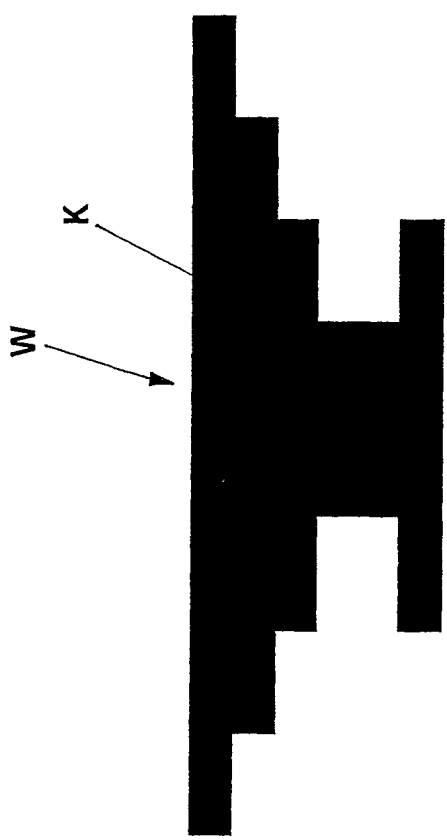

The collection of the finished three-dimensional object W, represented in FIG. 9, is carried out by cooling the base material M to ambient temperature in such a way as to cause the non-stimulated material M1 to return to the liquid state, as shown in FIG. 8.

Said collection is facilitated by the presence of the non-stimulated layer L0, visible in FIG. 3, interposed between the platform 2a and the object W.

The arrows visible in the figures illustrate the movements of the platform 2a, of the laser generator 9, of the dispensing nozzle 6 and of the cutter 8a during the various operations described.

In particular, the platform 2a is preferably powered in the vertical direction, while the nozzle 6, the cutter 8a and the laser generator 9 move horizontally, on one axis or on two axes orthogonal to each other.

It is evident, however, that in construction variants of the invention the relative movements of the above mentioned devices 2a, 6, 8a and 9 can be different from those illustrated herein and may include, for example, the movement on three axes of the platform 2a only in relation to the other devices.

In any case, as already mentioned, the power means of said devices are known per se to those skilled in the art.

The above shows that the method and the machine of the invention achieve the set objects.

In particular, the cooling of the base material allows it to solidify and to support the three-dimensional object being produced, thus eliminating the need for special supports.

Furthermore, the cooling of the base material takes place almost instantaneously, which eliminates any waiting time and makes the method of the invention particularly rapid.

Furthermore, as the base material is not heated above ambient temperature, it does not deteriorate and therefore any excess material can be reused for successive production cycles.

In addition to the above, the hardening of the base material obtained by cooling makes it suited to be processed mechanically in order to obtain layers with more precise thickness compared to those obtainable with the known methods.

In the construction stage, the method and the machine that are the subjects of the invention may undergo further changes or modifications concerning, for example, the type of base material used and, consequently, the type of stimulation used to achieve the permanent solidification of said material.

Other construction variants may concern the mechanisms used for the relative movements of the various parts of the machine.

In any case, the above mentioned modifications or variants, even if they are neither described herein nor illustrated in the drawings, must all be considered protected by the present patent, provided that they fall within the scope of the following claims.

The invention claimed is:

1. Method for manufacturing three-dimensional objects consisting of a plurality of superimposed layers of a base material, liquid at ambient temperature and capable of solidifying permanently following a stimulating action, comprising the operations described below:
   spreading a layer of said liquid base material on a preceding layer;
   selectively exposing said preceding layer to said stimulation in one or more predefined areas;
   repeating said spreading operation and said exposure for each successive layer of said three-dimensional object, and
   cooling said layers to a predefined operating temperature below said ambient temperature before said stimulation, in order to make said base material solidify,
   wherein it comprises an operation for spreading a base layer of said base material before spreading the first layer of said three-dimensional object, said base layer not being subjected to said stimulation.

2. Method according to claim 1), wherein said cooling operation lasts for the whole duration of said spreading operation and exposure of said layers.

3. Method according to claim 2), wherein said cooling of each one of said layers takes place spontaneously by contact with the preceding layer.

4. Method according to claim 1), wherein said cooling operation is carried out by means of Peltier cells.

5. Method according to claim 1), wherein it comprises an operation for levelling each one of said layers before spreading the successive layer.

6. Method according to claim 4), wherein said levelling operation takes place before said stimulation.

7. Method according to claim 1), wherein said spreading of said base material takes place selectively in predefined areas.

8. Method according to claim 1), wherein said spreading of each one of said layers takes place by means of a dispensing nozzle.

9. Method according to claim 1), wherein said base material is a photopolymer and said stimulation is achieved by means of predefined radiations.

10. Method according to claim 1), wherein it comprises an operation for eliminating the non-stimulated base material.

11. Method according to claim 10), wherein said elimination is achieved by exposing said layers to said ambient temperature.

12. Method according to claim 6), wherein said levelling operation is made through a tool for the mechanical removal of material.

13. Method according to claim 12), wherein said tool is a cutter.

14. Method according to claim 9), wherein said predefined radiation is emitted through a laser generator.

* * * * *